US012777359B2

(12) United States Patent
Mariyani et al.

(10) Patent No.: US 12,777,359 B2
(45) Date of Patent: Oct. 27, 2026

(54) NETWORK SLICE PRIORIZATION FOR IMS APPLICATION SERVERS

(71) Applicant: T-Mobile Innovations LLC, Overland Park, KS (US)

(72) Inventors: Anil Kumar Mariyani, Ashburn, VA (US); Subramania Kaushik, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 267 days.

(21) Appl. No.: 18/413,656

(22) Filed: Jan. 16, 2024

(65) Prior Publication Data

US 2025/0234235 A1 Jul. 17, 2025

(51) Int. Cl.

*H04W 28/02* (2009.01)
*H04L 65/1016* (2022.01)
*H04L 65/80* (2022.01)
*H04W 8/04* (2009.01)

(52) U.S. Cl.

CPC ..... *H04W 28/0215* (2013.01); *H04L 65/1016* (2013.01); *H04L 65/80* (2013.01); *H04W 8/04* (2013.01)

(58) Field of Classification Search

CPC ................ H04W 28/0215; H04W 8/04; H04L 65/1016; H04L 65/80

See application file for complete search history.

(56) References Cited

U.S. PATENT DOCUMENTS 11,470,620 B2 10/2022 IJntema et al.
11,696,200 B2 7/2023 Park et al.
2021/0021647 A1* 1/2021 Cai ........................ H04L 45/306
2023/0062145 A1* 3/2023 Sabeur .................. H04W 24/10
2023/0180017 A1* 6/2023 Gadalin ................ H04W 16/22 370/328
2023/0269136 A1* 8/2023 Gupta ................... H04W 76/10 370/254
2024/0414637 A1* 12/2024 Kuravangi-Thammaiah ............... H04W 48/18

* cited by examiner

*Primary Examiner* — Abdullahi Ahmed

(74) *Attorney, Agent, or Firm* — Jones Burke, PLLC

(57) ABSTRACT

Systems, methods, and devices are provided for network slice prioritization for wireless devices during network overload conditions. Methods include receiving notification of network overload conditions and receiving notification of an attach request from a wireless device at home subscriber service (HSS). The HSS obtains a priority network slice for the wireless device from a unified data repository (UDR). The priority network slice for the wireless device is shared with one or more IMS application servers, such as interrogating call session control function (I-CSCF) serving call session control function (S-CSCF), and telephony application server (TAS).

20 Claims, 5 Drawing Sheets

NETWORK SLICE PRIORIZATION FOR IMS APPLICATION SERVERS

TECHNICAL BACKGROUND

A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 4G RATs (new radio (NR)). Further, different types of access nodes may be implemented for deployment for the various RATs. Evolve NodeB (eNodeB or eNB) may be utilized for 4G RATs.

In current wireless implementations, users may operate wireless devices or UEs based on subscriptions. These subscriptions may allow for different priorities. For example, some users, who are wireless priority subscribers (WPS), may be prioritized over other users for wireless services. The prioritized users may, for example, include, first responders, emergency personnel, or law enforcement personnel.

Overview

Exemplary embodiments described herein include systems, methods, computer-readable media, and processing nodes for network slice prioritization.

The method comprises receiving notification of network overload conditions and receiving notification of an attach request from a wireless device. A priority network slice is obtained for the wireless device from a unified data repository (UDR). The priority network slice for the wireless device is shared with one or more IP multimedia subsystem (IMS) application servers. The one or more IMS application servers utilize the priority network slice for the wireless device, for example for attaching the wireless device to a wireless network.

In examples, the one or more IMS application servers comprise interrogating call session control function (I-CSCF) serving call session control function (S-CSCF), and telephony application server (TAS). The network overload conditions comprise IP network outage, a fiber cut, site isolation, network congestion, or natural calamities and may be indicated by satisfying a threshold of network slowdown. The priority network slice for the wireless device is identified at the transport/IP layer.

A system is provided comprising at least one memory storing instructions and a database, the database, and a processor executing the instructions to perform operations. The operations comprise receiving notification of network overload conditions and receiving notification of an attach request from a wireless device at home subscriber service (HSS). The operations further comprise obtaining a priority network slice for the wireless device from a unified data repository (UDR). The priority network slice for the wireless device is shared with one or more IMS application servers.

A non-transitory computer readable medium storing instructions executed by a processor is provided to perform operations. The operations comprise receiving notification of network overload conditions at a home subscriber service (HSS) and receiving notification of an attach request from a wireless device at home subscriber service (HSS). The operations further comprise obtaining a priority network slice for the wireless device from a unified data repository (UDR) and sharing the priority network slice for the wireless device with one or more IMS application servers.

An additional exemplary embodiment includes a processing node programmed to perform the methods described herein.

DETAILED DESCRIPTION

Figure 1:
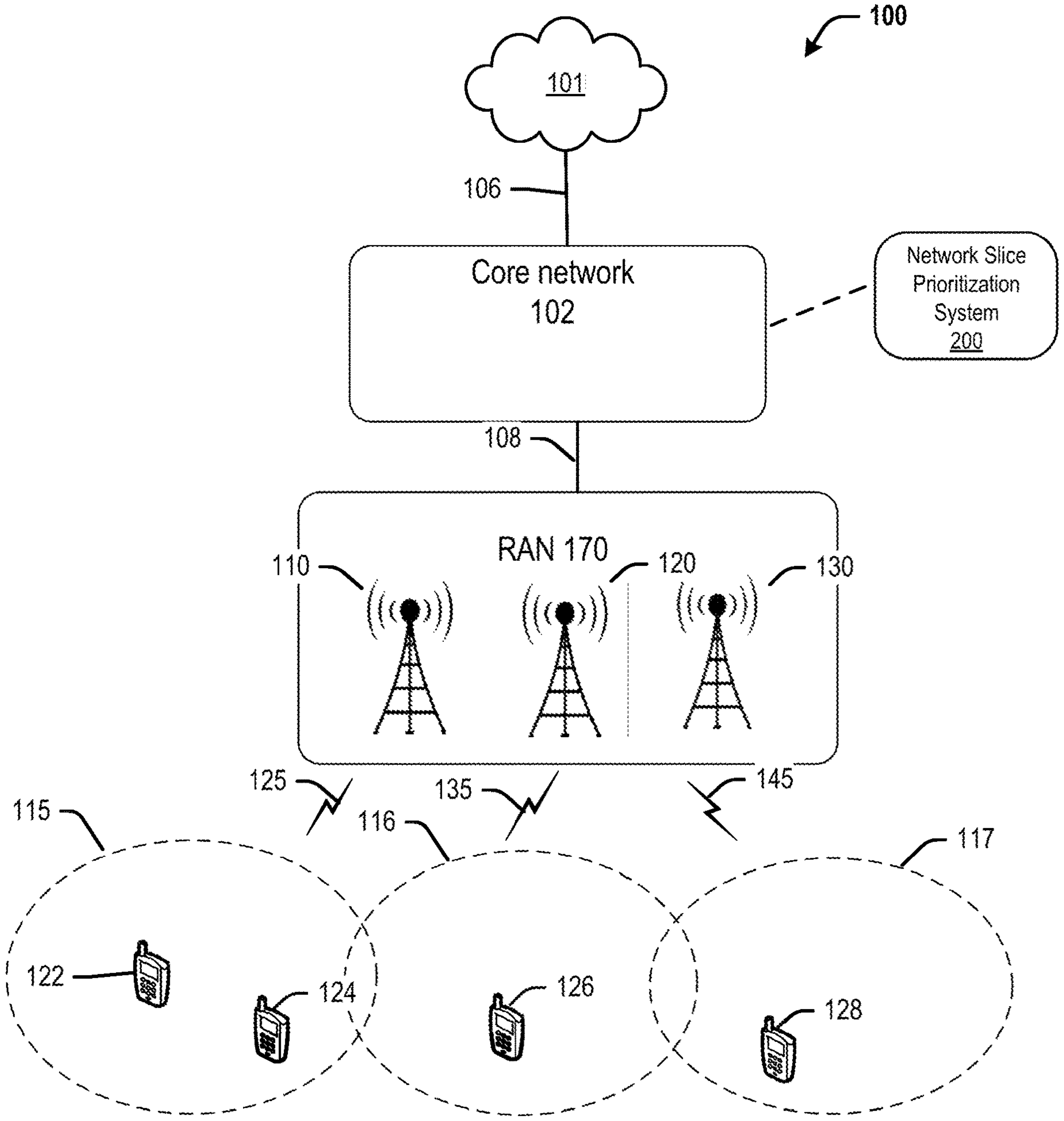
FIG. 1 depicts an exemplary operating environment system for prioritizing wireless devices during an attach procedure in accordance with the disclosed embodiments.

Exemplary embodiments described herein include systems, methods, and devices for prioritizing subscribers on network slices during network overload conditions. The attach procedure occurs when the wireless device initially registers to the network. Embodiments provided herein modify existing network processes and components to support prioritization during attachment so that prioritized subscribers are more easily able to access the network during periods of network overloading and congestion.

The evolution of 4G RATs has resulted in significant network architectural developments. The 4G core network is delivered through a set of interconnected IMS application servers. The IMS application servers are able to access the services of the other IMS application servers.

In current wireless implementations, users may operate wireless devices or UEs based on subscriptions. These subscriptions may allow for different priorities. For example, some users, for example, wireless priority subscribers (WPS), may be prioritized over other users for wireless services. Some prioritized users may, for example, include, first responders, emergency personnel, or law enforcement personnel. However, existing 4G implementations do not have an established method available for prioritizing network slices and assigning priority subscribers to the prioritized network slices when experiencing network overload conditions.

In a typical mobile network operator (MNO) environment, an IP network backbone is common for all network slices. Typically, a UE/subscriber can be part of multiple network slices in an MNO environment. There is no slice identification possible at the transport/IP layer.

The system and method for network slice prioritization allows for slice identification at the transport/IP Layer. Network slices may be allocated based on subscriber priority level. A network slice ID may be configured at the subscriber level in unified data repository (UDR).

The system and method for network slice prioritization allows 4G IMS application servers (such as I-CSCF, S-CSCF, and TAS, etc.) to prioritize one network slice over the other during network overload conditions. Slice priority is provisioned or assigned at the subscriber level and sent over the application layer.

The UDR has the capability to provision slice priority at each subscriber level. For a subscriber with multiple slice IDs (S-NSSAI), one of the slice ID carries higher priority over others. Using the system and method for network slice prioritization, an MNO has the flexibility to provision a higher priority network slice and provision its use based on the subscriber priority and network services.

During UE registration with the UE registration with the 4G eNB and the 4G core network, using subscribe/notify call flows, HSS fetches the slice priority from UDR and shares it with 4G IMS application servers. IMS is the architectural framework for delivering IP multimedia services. For VoNR, 4G HSS is involved based on 3GPP specifications. In examples, during VoNR IMS registration and notification of wireless devices on SBI N70 and N71 interfaces, the HSS shares network slice priority for the wireless device with I-CSCF, S-CSCF, TAS and other IMS application servers.

During network overload conditions, such as IP network outage, a fiber cut, site isolation, network congestion, and natural calamities (e.g., data center flooding, power outage, earthquakes, fires, tornadoes, and hurricane related outages), 4G IMS application servers can utilize network slice prioritization. Network overload conditions may be indicated by satisfying a threshold of network slowdown.

As subscribers can be provisioned to a priority network slice, priority subscribers are provided network service during network overload conditions and network critical situations.

Embodiments described herein operate in conjunction with the IMS application servers of the 4G core network to provide priority to priority subscribers during network overload conditions. Prioritization of a subscriber UE is performed, and the priority information is downloaded from the 4G unified data repository UDR by the 4G unified data management HSS. The HSS then transmits the UE priority slice information to IMS application servers such as interrogating call session control function (I-CSCF) serving call session control function (S-CSCF), and telephony application server (TAS).

Thus, during network overload conditions network slice prioritization system causes the IMS application servers to assign and share subscriber slice priority. The assignment and sharing may be performed in response to network overload conditions. This process helps the network to prioritize specific WPS such as during network congestion and severe overload conditions. Thus, an objective of the systems and methods set forth herein is to provide guaranteed service for priority subscribers during the 4G attach. Through the use of systems, methods, and devices described herein, existing registration processes are improved with additional functionality enabling recognition and preferred treatment of priority subscribers.

FIG. 1 depicts an exemplary system 100 for wireless communication, in accordance with the disclosed embodiments. The system 100 may include a communication network 101, core network 102, and a radio access network (RAN) 170 including access nodes 110, 120, and 130. The RAN 170 may include other devices and additional access nodes. Although three access nodes are shown, any number of access nodes may be included.

The system 100 also includes multiple wireless devices 122, 124, 126, and 128, which may be end-user wireless devices and may operate within one or more coverage areas 115, 116, and 117. The wireless devices 122, 124, 126, 128 communicate with access nodes 110, 120, and/or 130 within the RAN 170 over communication links 125, 135, and 145, which may for example be 4G NR communication links.

The system 100 may further include a network slice prioritization system 200, which is illustrated as operating at a level of the core network 102. However, it should be noted that the network slice prioritization system 200 may be an entirely discrete system operating within the core network 102 or from outside of the core in a separate processing node.

The network slice prioritization system 200 operates based on requests for attachment from the wireless devices 122, 124, 126, and 128. The attach requests may reach the core network 102, which utilizes programming of the network slice prioritization system 200 for subscriber and priority slice look-up. Based on the look-up, the network slice prioritization system 200 transmits a response including a slice priority of the subscriber to the core network 102.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124, 126, 128. Wireless network protocols can comprise Fifth Generation mobile networks or wireless systems (4G or 4G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core IMS application servers and elements. The core network 102 may be separated into user plane functions and control plane functions. The user plane accesses a data network, such as network 101, and performs operations such as packet routing and forwarding, packet inspection, policy enforcement for the user plane, quality of service (QOS) handling, etc. The control plane handles radio-specific functionality that depends on the idle or connected states of the wireless devices 122, 124, 126, and 128.

Communication links 106 and 108 can use various communication media, such as air, space, metal, optical fiber, or some other signal propagation path-including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links may use electromagnetic waves in the radio frequency (RF), microwave, infrared (IR), or other wavelength ranges, and may use a suitable communication protocol, including 4G including 4G NR or 4G Advanced, 6G, NTN, or combinations thereof.

Communication links 106 and 108 can be direct links or might include various equipment, intermediate components, systems, and networks, such as a cell site router, etc.

Communication links 106 and 108 may comprise many different signals sharing the same link.

The RAN 170 may include various access network systems and devices such as access nodes 110, 120, 130. The RAN 170 is disposed between the core network 102 and the end-user wireless devices 122, 124, 126, 128. Components of the RAN 170 may communicate directly with the core network 102 and others may communicate directly with the end user wireless devices 122, 124, 126, 128. The RAN 170 may provide services from the core network 102 to the end-user wireless devices 122, 124, 126, and 128.

The RAN 170 includes multiple access nodes (or base stations) 110, 120, 130, which may include one or more eNodeBs communicating with the plurality of end-user wireless devices 122, 124, 126, 128. It is understood that the disclosed technology may also be applied to communication between an end-user wireless device and other network resources, such as relay nodes, controller nodes, antennas, etc. The RAN 170 may further comprise a non-terrestrial network (NTN) serving the multiple UEs by a radio frequency transmission provided by utilizing orbiting satellites that may be in communication with access nodes of a terrestrial network (TN). The satellites may include geosynchronous equatorial orbit (GEO) satellites, Medium Earth Orbit (MEO) satellites, and low Earth orbit (LEO) satellites. The NTN may include NTN nodes that are not stationed on the ground.

Access nodes 110, 120, 130 can be, for example, standard access nodes such as a macro-cell access node, a base transceiver station, a radio base station, an, an evolved NodeB (or eNodeB) in 4G or 4G LTE or the like. In additional embodiments, access nodes may comprise two co-located cells, or antenna/transceiver combinations that are mounted on the same structure. Alternatively, access nodes 110, 120, 130 may comprise a short range, low power, small-cell access node such as a microcell access node, a picocell access node, a femtocell access node. Access nodes 110, 120, 130 can be configured to deploy one or more different carriers, utilizing one or more RATs. Any other combination of access nodes and carriers deployed therefrom may be evident to those having ordinary skill in the art in light of this disclosure.

The access nodes 110, 120, 130 can comprise a processor and associated circuitry to execute or direct the execution of computer-readable instructions. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node. Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VoIP) phone, a voice over packet (VOP) phone, or a soft phone, a wearable device, an internet of things (IoT) device, as well as other types of devices or systems that can send and receive audio or data. The wireless devices 122, 124, 126 128 may be or include high power wireless devices or standard power wireless devices.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the radio access network 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The network slice prioritization may be implemented as computer-readable instructions or methods, and processing nodes on the network for executing the instructions or methods. The processing node may include a processor included in the access node or a processor included in any controller node in the wireless network that is coupled to the access node.

Figure 2:
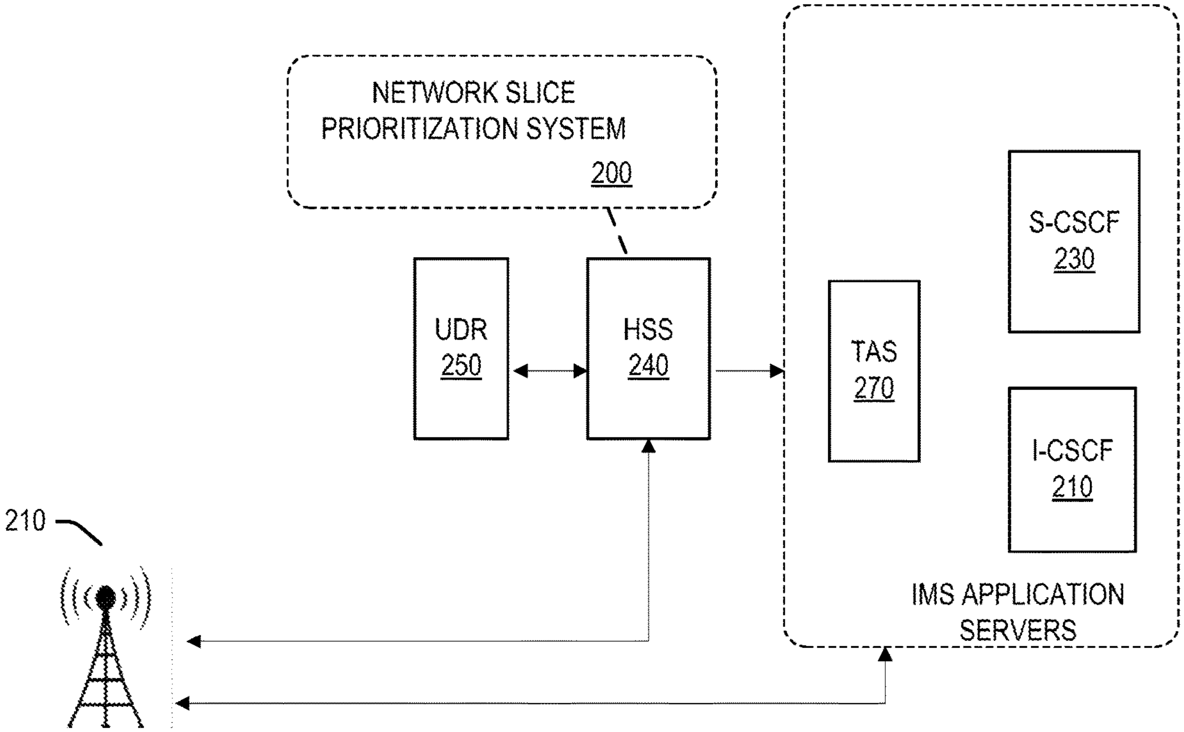
FIG. 2 illustrates an additional exemplary operating environment for a network slice prioritization system in accordance with disclosed embodiments.

FIG. 2 depicts an exemplary environment for a network slice prioritization system 200 in accordance with the disclosed embodiments. As explained above, the network slice prioritization system 200 may be a discrete component or may be incorporated in a core network 102. The environment shown in FIG. 2 illustrates operation of the network slice prioritization system 200 with reference to components of the core network 102. Components shown in FIG. 2 include control plane functions, such as home subscriber service (HSS) 240, unified data repository (UDR) 250. The HSS 240 is in communication with an access and mobility function comprise interrogating call session control function (I-CSCF) 210, serving call session control function (S-CSCF) 230, and telephony application server (TAS) 270 as well as other IMS application servers. Additional or fewer control plane functions may also be included.

When any wireless device 122, 124, 126, 128 is registered with the network, the subscriber priority and network slice priority assigned is stored in the UDR 250. UDR 250 stores network slice priority. Network slices may be allocated based on subscriber priority level. Network slice priority may include a range of priorities, ranging for example from a priority 1 to a priority 5. Network slice priority prioritizes one network slice over the other during network overload conditions. For example, a network slice priority 1 is provided 4G IMS application servers (such as I-CSCF, S-CSCF, TAS etc.) before network slices with priority 2-5. A network slice ID with an associated priority may be configured for a UE at the subscriber level in the HSS/UDR. A UE, such as a 4G UE, to access an authorized network slice with the associated priority. For example, specific WPS or first responder subscribers may be assigned to a network slice with priority 1.

The system and method for network slice prioritization allows 4G IMS application servers (such as I-CSCF, S-CSCF, TAS etc.) to prioritize one network slice over the other during network overload conditions. Slice priority is provisioned or assigned at the subscriber level and sent over the application layer.

The UDR has the capability to provision slice priority at each subscriber level. For a subscriber (4G subscription) with multiple slice IDs (S-NSSAI), one of the slice ID carries higher priority over others. Using the system and method for network slice prioritization, an MNO has the flexibility to provision a higher priority network slice and provision its use based on the subscriber priority and network services.

The HSS 240 communicates with the UDR 250 to obtain subscription information. Although only one UDR 250 is shown, multiple UDRs 250 may store information and the UDRs 250 may be managed by the HSS 240. The HSS 240 manages network slice priority, if available, and provides network slice priority based on subscription information to the IMS application servers such as interrogating call session control function (I-CSCF) 210, serving call session control function (S-CSCF) 230, and telephony application server (TAS) 270. Other network slice priority subscriptions are within scope of the disclosure.

I-CSCF 210 is used for IMS roaming. I-CSCF 210 enables requests to be routed to the correct S-CSCF 230. The I-CSCF 210 interrogates the HSS 240 to obtain the address of the relevant S-CSCF 230 to process the session initiation protocol (SIP) initiation request.

The S-CSCF 230 in the IMS is responsible for session control. Subscribers will be allocated a S-CSCF 230 for the duration of their IMS registration in order to facilitate routing of SIP messages as part of service establishment procedures. Consequently, the S-CSCF 230 will download a subscriber profile from the HSS 240 at the time of registration, which allows the S-CSCF 230 to ascertain which application server any service requests should be sent.

TAS 270 is used in the core network of a telecom network operator to provide telephony applications and additional multimedia functions.

The HSS 240 is a cloud native IMS application server that controls network user data (i.e., the data of subscribers) in a centralized manner. The HSS 240 manages the user data for other processes. The HSS interfaces with many other NFs. When the other NFs need subscriber data, they send a request to the HSS 240. The HSS 240 provides user subscription data, such as data used to authenticate wireless devices. The HSS accesses the UDR for the database to store subscription information and slice priority.

In order to attach to the wireless network, the UEs or wireless devices 122, 124, 126, 128, send a request over the RAN 170. The requests may be handled by components of the core network 102 described herein. The UDR 250 determines network slice priority available to the requesting subscriber and the HSS 240 may respond appropriately to the application servers.

In operation, components of the network slice prioritization system 200 may interact with the illustrated components and may be incorporated in the illustrated components. This interaction will be further described with reference to FIGS. 4 and 5. Without the network slice prioritization system 200 described herein, priority subscribers would be detrimentally impacted during overload conditions. Accordingly, embodiments provided herein add the network slice prioritization system 200 to interact with the illustrated components.

Figure 3:
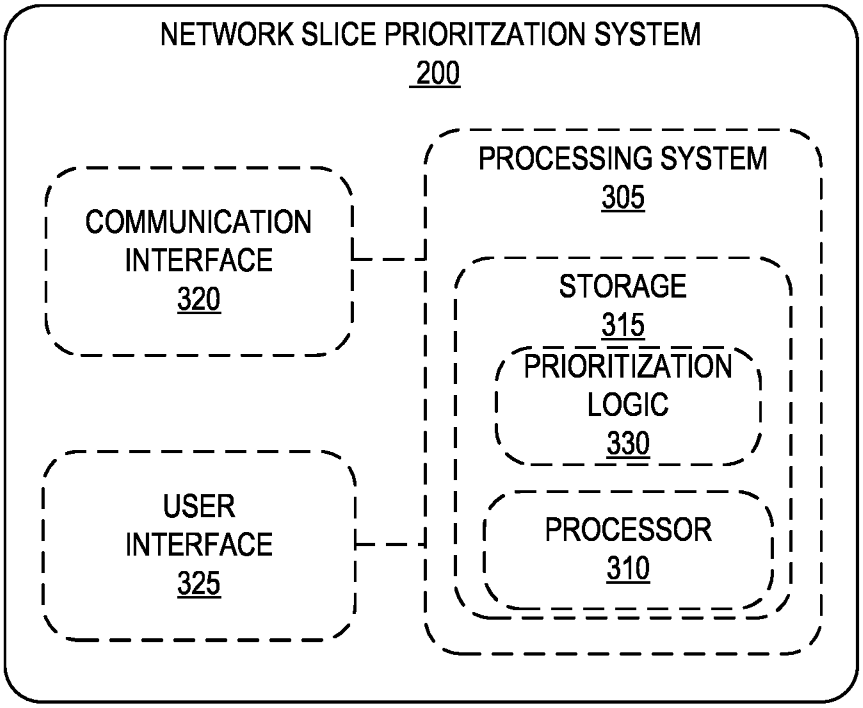
FIG. 3 illustrates an embodiment of a network slice prioritization system in accordance with disclosed embodiments.

FIG. 3 depicts details of a network slice prioritization system 200 as a discrete component, which may be configured to perform the methods and operations disclosed herein to facilitate recognition of priority subscribers during attachment. In the disclosed embodiments, the network slice prioritization system 200 may be located within the core network 102 or may be integrated with a separate processing node or with the various displayed components in FIG. 2. Alternatively or additionally, multiple network slice prioritization systems 200 may be disposed to accommodate wireless devices in different coverage areas 115, 116, 117.

The network slice prioritization system 200 ensures that users requesting attachment to the network are granted priority in accordance with their subscriptions. For example, first responders, emergency personnel, and law enforcement personnel will receive priority in connecting to the network, thus enabling connection during heavy network load or congestion. To perform these functions, the network slice prioritization system 200 may include a processing system 305 including a storage area 315 and a processor 310. The storage device 315 may store prioritization logic 330. The prioritization logic 330 may include computer readable instructions to assist in distinguishing between priority subscribers and non-priority subscribers and to convey the determination in order to ensure wireless device users are properly prioritized during attach procedures.

Storage device 315 may include a disk drive, a flash drive, a memory, or other storage device configured to store data and/or computer readable instructions or codes (e.g., software). The computer executable instructions or codes may be accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. For example, instructions may be provided to look up wireless device user priorities, attach the priority to a response to an attach request, and transmit the response to ensure that priority is properly applied to each wireless user. Processor 310 may be a microprocessor and may include hardware circuitry and/or embedded codes configured to retrieve and execute software stored in storage device 315.

The network slice prioritization system 200 may include a communication interface 320 and a user interface 325. Communication interface 320 may be configured to enable the processing system 305 to communicate with other components, nodes, or devices in the wireless network. For example, the network slice prioritization system 200 can provide instructions to the above-described components to ensure that priority is properly applied during attach procedures.

Communication interface 320 may include hardware components, such as network communication ports, devices, routers, wires, antenna, transceivers, etc. User interface 325 may be configured to allow a user to provide input to the network slice prioritization system 200 from other components. User interface 325 may include hardware components, such as touch screens, buttons, displays, speakers, etc. The network slice prioritization system 200 may further include other components such as a power management unit, a control interface unit, etc.

The network slice prioritization system 200 thus may utilize the memory 315 and the processor 310 to perform multiple operations. For example, the processor 310 may access stored instructions in the memory 315 to determine priorities and attach the determined priorities to responses in order to ensure proper prioritization of wireless users during an attach procedure.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 or the system 200 may be, comprise, or include computers systems and/or processing nodes, including access nodes, controller nodes, and gateway nodes described herein.

Figure 4:
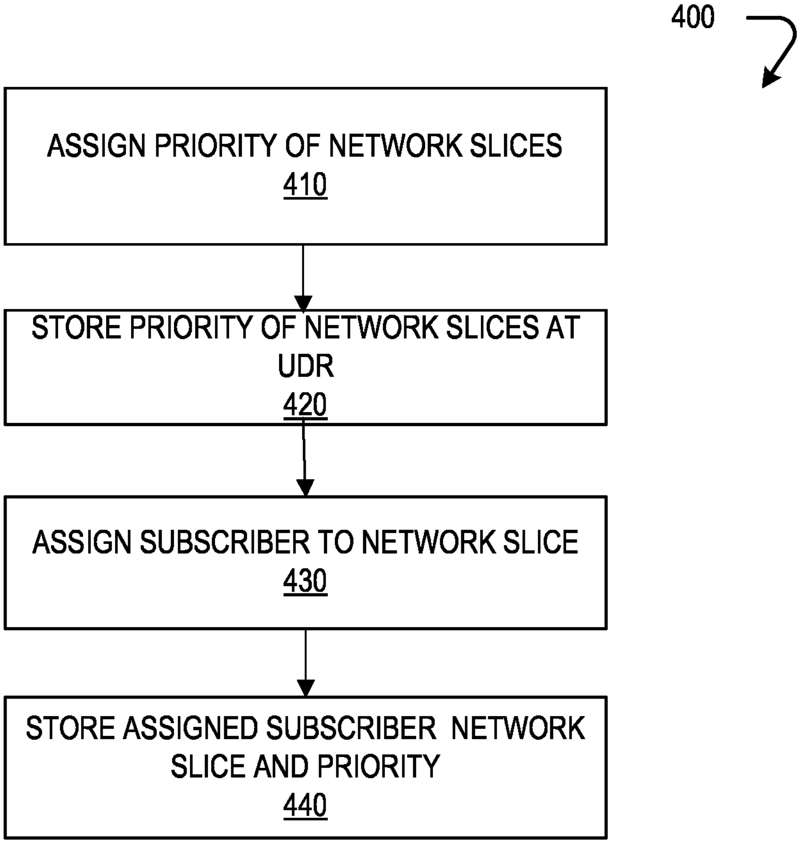
FIG. 4 is a flowchart depicting prioritizing network slices and subscribers in accordance with disclosed embodiments.

The disclosed methods for network slice prioritization are discussed further below. FIG. 4 illustrates an exemplary method 400 for processing an attach request in accordance with embodiments set forth herein. Method 400 may be performed by any suitable combination of processors discussed herein, for example, a processor contained in an access node 110, 120, 130, processors contained in the HSS 240, and/or UDR 250, or the processor 310 included in the network slice prioritization system 200 and/or other processors included in the components and functions shown in FIG. 3.

Method 400 begins in step 410, where network slice priority is assigned. Network slices may then be allocated based on subscriber priority level. Network slice priority may include a range of priorities, ranging for example from a priority 1 to a priority 5. Network slice priority prioritizes one network slice over the other during network overload conditions. For example, a network slice priority 1 is provided 4G IMS application servers (such as I-CSCF, S-CSCF, and TAS) before network slices with priority 2-5. Each network slice has a network slice ID.

In step 420, network slice priority for a subscriber/wireless device is stored in the UDR 250. In step 430, subscriber is assigned a network slice for when overload conditions occur. A network slice ID with an associated priority may be configured for a UE at the subscriber level in UDR. For example, specific WPS or first responder subscribers may be assigned to a network slice with priority 1. While lower priority subscribers are assigned to lower priority network slices when overload conditions occur. In step 440, the assigned subscriber network slice and priority is stored in the UDR such that it may be accessed by the HSS according to FIG. 5.

Figure 5:
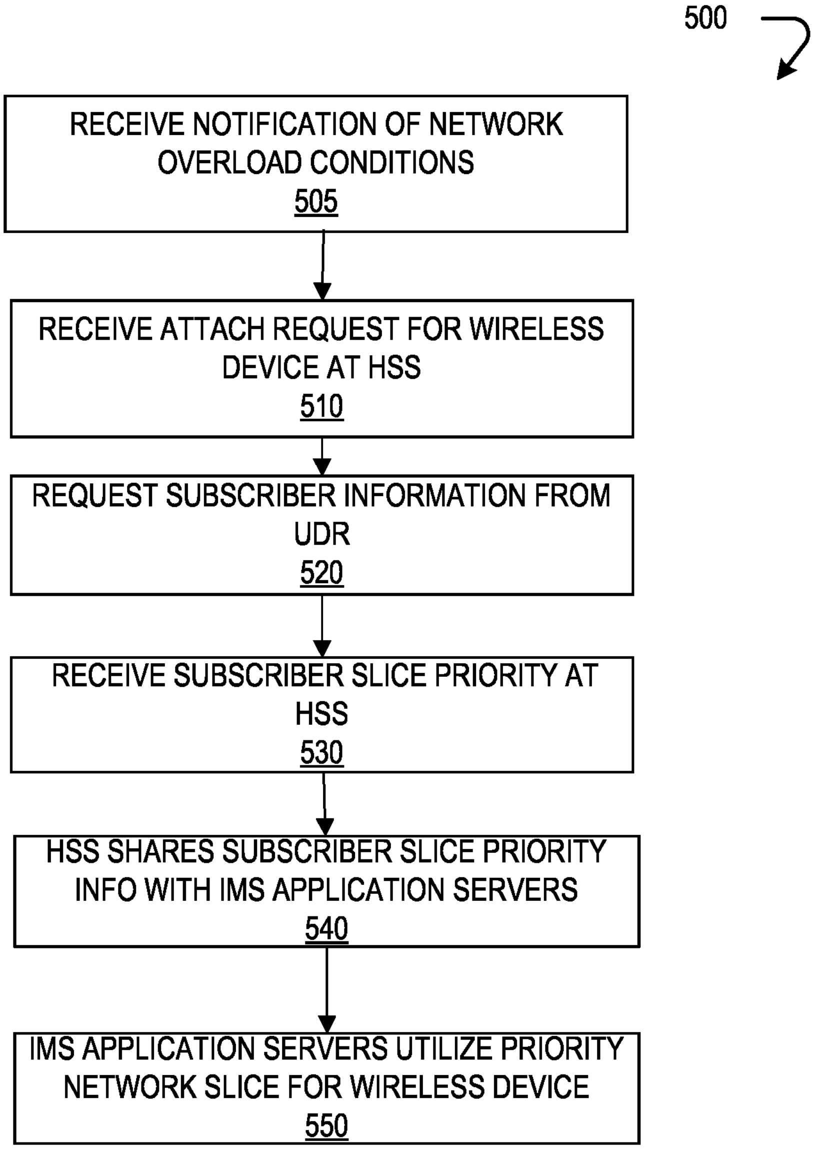
FIG. 5 is a flowchart depicting sharing subscriber slice priority information with IMS application servers in accordance with disclosed embodiments.

FIG. 5 illustrates further details of the method performed by the network slice prioritization system 200 in order to determine a priority of a wireless device subscriber in accordance with provided embodiments. The steps of method 500 particularly describe the processing of the attach request to assign a network slice based on priority in response to the request. The assignment of priority occurs through processing by the by the HSS 240 and UDR 250. Method 500 may further be performed by any suitable processor discussed herein, for example, a processor 310 included in the network slice prioritization system 200 or a combination of the processor 310 with other processors, such as a processor of the HSS 240, and UDR 250.

Beginning in step 505, notification of overload conditions in the network is received. In step 510, the HSS 240 receives an attach request from a wireless device. The attach request may occur during a network overload conditions. In step 520, to the HSS 240, interacts with the UDR 250. For example, the HSS 240 forwards the attach request to the HSS and performs a database lookup of the UDR 250. At step 530, the network slice prioritization system 200 causes the UDR 250 to share the slice priority for the wireless device and respond to the HSS 240 with the priority. Thus, the HSS 240 receives the stored network slice priority for the wireless device. In step 540 the network slice prioritization system 200 causes the HSS 240 to share the stored priority with the IMS application servers such as interrogating call session control function (I-CSCF) serving call session control function (S-CSCF), and telephony application server (TAS).

In step 550, the network slice priority for a wireless device is used by IMS application servers, such as interrogating call session control function (I-CSCF) serving call session control function (S-CSCF), and telephony application server (TAS). In some examples, the IMS application servers utilize the network slice priority for a wireless device to attach the wireless device to the network and so that the wireless can conduct communications on the wireless network.

In some embodiments, methods 400 and 500, may include additional steps or operations. Furthermore, the methods may include steps shown in each of the other methods. As one of ordinary skill in the art would understand, the methods 400 and 500 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all be within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

receiving notification of network overload conditions;

receiving notification of an attach request from a wireless device at home subscriber service (HSS);

obtaining a priority network slice for the wireless device from a unified data repository (UDR); and sharing the priority network slice for the wireless device with one or more internet protocol (IP) multimedia subsystem (IMS) application servers, wherein the one or more IMS application servers utilize the priority network slice to attach the wireless device to a wireless network.

2. The method of claim 1, wherein the one or more IMS application servers utilize the priority network slice for the wireless device to communicate on the wireless network.

3. The method of claim 1, wherein the one or more IMS application servers comprise interrogating call session control function (I-CSCF) serving call session control function (S-CSCF), and telephony application server (TAS).

4. The method of claim 1, wherein the network overload conditions comprise IP network outage, a fiber cut, site isolation, network congestion, or natural calamities.

5. The method of claim 1, wherein the network overload conditions are indicated by satisfying a threshold of network slowdown.

6. The method of claim 1, wherein the priority network slice for the wireless device is identified at transport/IP layer.

7. The method of claim 1, wherein the wireless device comprises a wireless priority subscriber (WPS) subscription.

8. A system comprising:

at least one memory storing instructions and a database, the database storing subscriber information including a subscriber priority; and a processor executing the instructions to perform operations including:

receiving notification of network overload conditions;

receiving notification of an attach request from a wireless device at home subscriber service (HSS);

obtaining a priority network slice for the wireless device from a unified data repository (UDR); and sharing the priority network slice for the wireless device with one or more internet protocol (IP) multimedia subsystem (IMS) application servers, wherein the one or more IMS application servers utilize the priority network slice to attach the wireless device to a wireless network.

9. The system of claim 8, wherein the one or more IMS application servers utilize the priority network slice for the wireless device to communicate on the wireless network.

10. The system of claim 8, wherein the one or more IMS application servers comprise interrogating call session control function (I-CSCF) serving call session control function (S-CSCF), and telephony application server (TAS).

11. The system of claim 8, wherein the network overload conditions comprise IP network outage, a fiber cut, site isolation, network congestion, or natural calamities.

12. The system of claim 11, wherein the network overload conditions are indicated by satisfying a threshold of network slowdown.

13. The system of claim 8, wherein the priority network slice for the wireless device is identified at transport/IP layer.

14. A non-transitory computer readable medium storing instructions executed by a processor to perform operations comprising:

receiving notification of network overload conditions;

receiving notification of an attach request from a wireless device at home subscriber service (HSS);

obtaining a priority network slice for the wireless device from a unified data repository (UDR); and sharing the priority network slice for the wireless device with one or more internet protocol (IP) multimedia subsystem (IMS) application servers, wherein the one or more IMS application servers utilize the priority network slice to attach the wireless device to a wireless network.

15. The system of claim 8, wherein the wireless device comprises a wireless priority subscriber (WPS) subscription.

16. The non-transitory computer readable medium of claim 14, wherein the one or more IMS application servers utilize the priority network slice for the wireless device to communicate on the wireless network.

17. The non-transitory computer readable medium of claim 14, wherein the one or more IMS application servers comprise interrogating call session control function (I-CSCF) serving call session control function (S-CSCF), and telephony application server (TAS).

18. The non-transitory computer readable medium of claim 17, wherein the network overload conditions comprise IP network outage, a fiber cut, site isolation, network congestion, or natural calamities.

19. The non-transitory computer readable medium of claim 14, wherein the network overload conditions are indicated by satisfying a threshold of network slowdown.

20. The non-transitory computer readable medium of claim 14, wherein the wireless device comprises a wireless priority subscriber (WPS) subscription.

* * * * *